Figure 1:
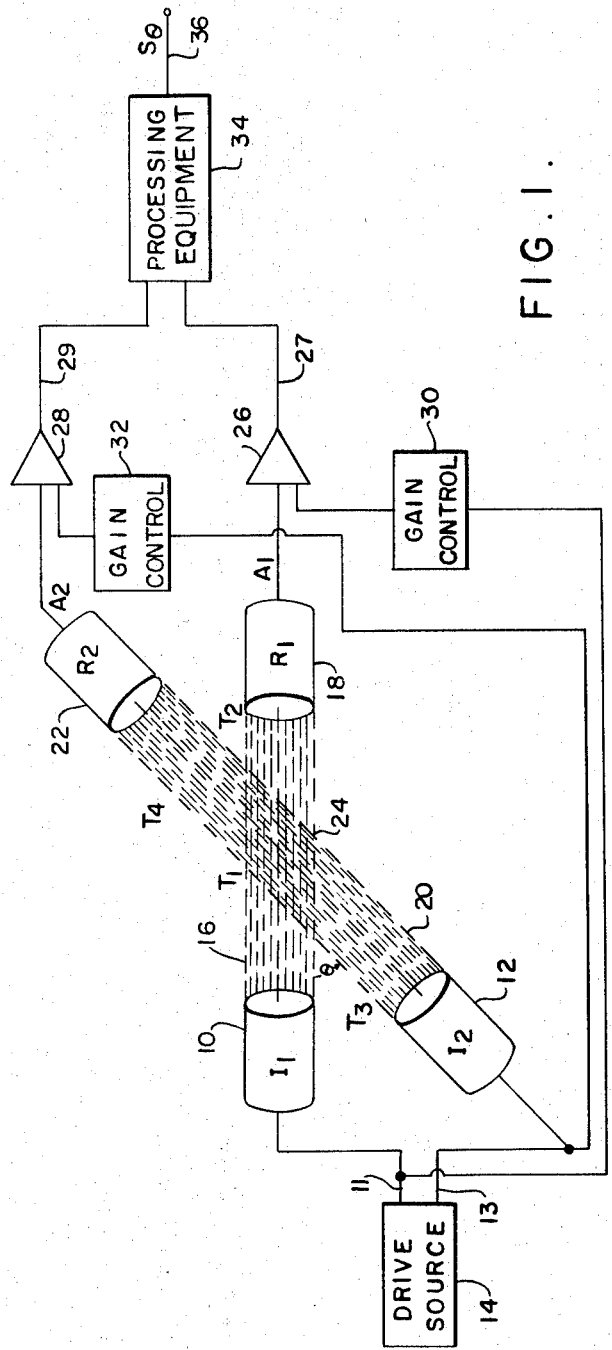

United States Patent

[11] 3,553,462

| [72] | Inventor | Dennis F. Johnson<br>Rockville, Md. |
|---|---|---|
| [21] | Appl. No. | 889,159 |
| [22] | Filed | Dec. 31, 1969 |
| [45] | Patented | Jan. 5, 1971 |
| [73] | Assignee | Exotech Incorporated<br>Rockville, Md.<br>a corporation of Delaware |

[54] APPARATUS FOR DETERMINING THE RADIATION SCATTERING PROPERTIES OF A FLUID(AND BY EX.)
6 Claims, 2 Drawing Figs.

[52] U.S. Cl. ................................................. 250/218,
250/220, 356/103
[51] Int. Cl. ....................................................G01n 21/26
[50] Field of Search............................................ 250/218,
228, 220; 356/103, 104, 102, 207, 208; 310/237, 236

[56] References Cited
UNITED STATES PATENTS

| 2,562,181 | 7/1951 | Frommer..................... | 250/218X |
| 3,320,428 | 5/1967 | Wagstaffe et al. ............ | 250/218 |
| 3,358,148 | 12/1967 | Conklin et al. ............... | 250/218 |
| 3,398,286 | 8/1968 | Ford et al. ................... | 250/218X |

Primary Examiner—Walter Stolwein
Attorney—Mc Lean, Morton and Boustead

ABSTRACT: Self-calibrating apparatus for determining the radiation scattering properties of a fluid. Radiation from a first source passes through the fluid in a first straight line path to a first radiation detector. Radiation from a second source passes through the fluid to a second radiation detector in a second straight line path intersecting the first path at the scattering angle of interest. The radiation detector outputs are combined to give the scattering coefficient.

PATENTED JAN 5 1971   3,553,462

INVENTOR
DENNIS F. JOHNSON

BY *McLean, Morton & Boustead*
ATTORNEYS

3,553,462

APPARATUS FOR DETERMINING THE RADIATION SCATTERING PROPERTIES OF A FLUID (AND BY EX.)

The present invention pertains to an apparatus for determining properties of a fluid. More particularly, the present invention pertains to a self-calibrating system for the determination of the radiation scattering properties of particles in fluids.

In numerous applications it is desirable to measure the scattering of radiation passing through a fluid. By way of illustration, from such measurements it is possible to determine properties of the scattering particles such as concentration and size distribution. Thus, for example, as a result of such measurements dust concentration in mines and industrial atmospheres can be monitored, particle concentrations in gases and liquids can be determined, the pollutant particle concentration in gases from smokestacks can be measured, and turbidity in liquids can be determined.

Numerous systems exist for measuring the scattering or deflection of radiation passing through a fluid, but in general such existing systems suffer from shortcomings. For example, such devices suffer from increased error as particles collect on optical surfaces in the radiation transmission paths. Fluctuations in the radiation source or in the radiation detector responsivity are interpreted as variations in the scattering coefficient of the fluid and so result in error. Any factors unrelated to the scattering coefficient but affecting the optical transmission through the fluid are interpreted as changes in the scattering coefficient. Thus, since such devices in general rely upon measurement of the gross radiation reaching the radiation detector, any cause of fluctuation in that radiation becomes a part of the system output signal, although numerous causes of fluctuation are not related to the properties of the medium which it is desired to measure.

The present invention is an apparatus for determining the radiation scattering properties in a fluid medium including self-calibrating means for ensuring that the output of the apparatus is free from errors due to variations in parameters of the apparatus. In accordance with the present invention, each element contributing to the scattering coefficient is utilized twice, and the outputs obtained during such use are combined in a manner which cancels all performance parameters which might fluctuate. Radiation from a first source is transmitted through the medium on a first path to a first radiation detector, and radiation from a second source is transmitted through the medium to a second detector on a second path intersecting the first path in the medium of interest at a scattering angle of interest. The outputs of the two radiation detectors are combined in a manner which permits determination of the scattering coefficient within the medium.

Figure 2:
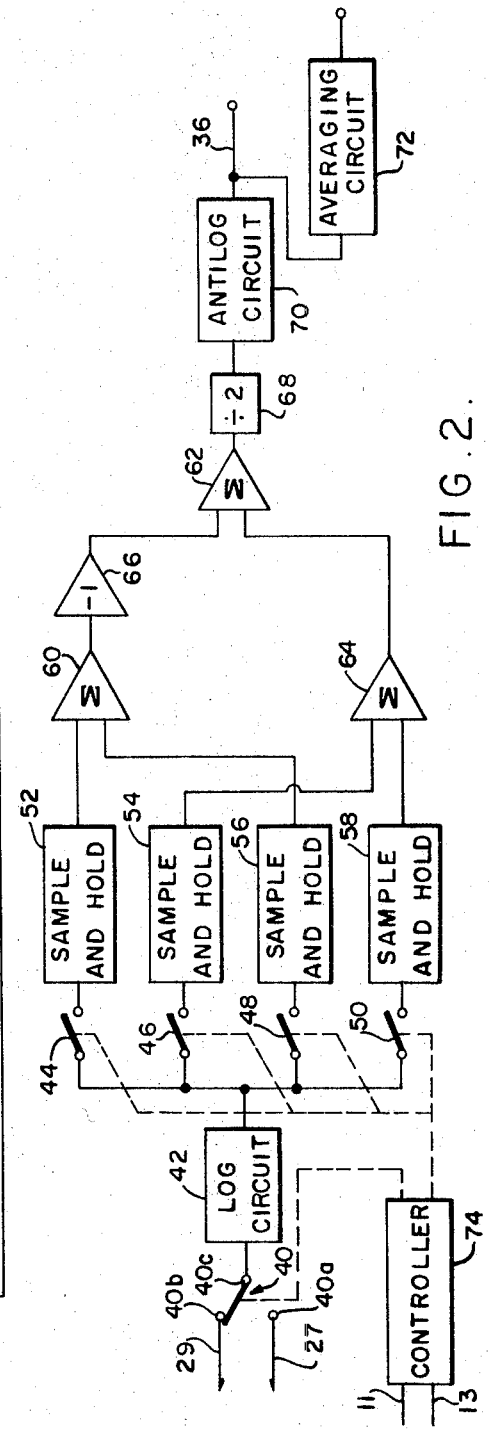

These and other aspects and advantages of the present invention are more apparent in the following detailed description and claims, particularly when considered in conjunction with the accompanying drawing. In the drawing:

FIG. 1 is a block diagram representation of a system for determining radiation scattering properties in a fluid medium in accordance with the present invention; and FIG. 2 is a block diagram of circuitry suitable for use as processing equipment in the system of FIG. 1.

As depicted in FIG. 1, radiation source 10 and radiation source 12 are connected via lines 11 and 13, respectively, to drive source 14 to be energized. Drive source 14 is a source of suitable electrical potential which alternately energizes radiation source 10 and radiation source 12. For example, drive source 14 can have an energization cycle providing application of excitation for a brief period to radiation source 10, application of excitation for a brief period to radiation source 12, and a brief period during which no excitation is provided to permit compensation for ambient light. Radiation sources 10 and 12 might be any suitable sources of light such as tungsten lamps, light emitting diodes, gas discharge tubes, lasers, etc.

Instead of alternately pulsing radiation sources 10 and 12, each source could be continuously energized and modulated by a unique signal, with filtering in the outputs of detectors 18 and 22 to separate the received signals into its two constituents.

Radiation from source 10 traverses straight line path 16 to radiation detector 18. Likewise radiation from source 12 traverses straight line path 20 to radiation detector 22. Radiation paths 16 and 20 intersect in zone 24 at an angle $\theta$ which is the scattering angle of interest. Angle $\theta$ can be any scattering angle of interest and might range from 0° to 180° in either direction from path 16. Zone 24 is the area in which paths 16 and 20 overlap and in which the fluid medium is located. Particles suspended within the fluid medium in zone 24 cause deflection or scattering of the radiation from sources 10 and 12 so that some of the radiation from source 10 is received by radiation detector 22 and some of the radiation from source 12 is received by radiation detector 18. Zone 24 can be defined by a container through which paths 16 and 20 pass, or a container can house not only zone 24 but also radiation sources 10 and 12 and radiation detectors 18 and 22. The output of radiation detector 18 is applied to amplifier 26, while the output of radiation detector 22 is applied to amplifier 28. Line 11, which applies excitation output of drive source 14 to radiation source 10, is also connected to gain control circuit 30, the output of which is utilized to control the gain within amplifier 26. In like manner, line 13, which applies the excitation output of drive source 14 to radiation source 12, is connected to gain control circuit 32, the output of which is utilized to control the gain within amplifier 28. The outputs of amplifiers 26 and 28 are connected via lines 27 and 29, respectively, to processing equipment 34 which provides the scattering coefficient $S\theta$ on its output line 36.

When radiation source 10 is energized, radiation from source 10 is received by both radiation detector 18 and radiation detector 22. If, as designated in the drawing, $A_1$ is the output of radiation detector 18 so that $A_{11}$ is the output of radiation detector 18 when radiation source 10 is energized and $A_{12}$ is the output of radiation detector 18 when radiation source 12 is energized, $T_1$ is the radiation transmission coefficient from radiation source 10 to zone 24, $T_2$ is the radiation transmission coefficient from zone 24 to radiation detector 18, $I_1$ is the radiation output from source 10, and $R_1$ is the radiation responsivity of detector 18, then the output of radiation detector 18 when radiation source 10 is energized is given by $A_{11} = I_1 T_1 T_2 R_1$. The radiation transmittance coefficient of an element is a number between 0 and 1 defining the portion of incident radiation which is transmitted through the element. Likewise, if $A_2$ is the output of radiation detector 22 so that $A_{21}$ is the output of radiation detector 22 when radiation source 12 is energized and $A_{21}$ is the output of radiation detector 22 when radiation source 10 is energized, $T_4$ is the radiation transmission coefficient from zone 24 to detector 22, $R_2$ is the radiation responsivity of detector 24, and $S\theta$ is the scattering coefficient within zone 24 over the angle $\theta$, then when radiation source 10 is energized, the output of radiation detector 22 is given by $A_{21} = I_1 T_1 T_4 R_2 S_{74}$. If $T_3$ is the radiation transmission coefficient from source 12 to zone 24 and $I_2$ is the radiation output from source 12, then when radiation source 12 is energized, and its radiation is detected by both detector 18 and detector 22, the output of radiation detector 18 is $A_{12} = I_2 T_3 T_4 R_2$. By combining these detector outputs, an expression for the scattering coefficient $S\theta$ within zone 24 is obtained:

$$\frac{A_{21}A_{12}}{A_{11}A_{22}} = \frac{(I_1 T_1 T_4 R_2 S_\theta)(I_2 T_3 T_2 R_1 S_\theta)}{(I_1 T_1 T_2 R_1)(I_2 T_3 T_4 R_2)} = S_\theta^2$$

Therefore, $S_\theta = [(A_{21}A_{12})/(A_{11}A_{22})]^{1/2}$

This scattering coefficient is calculated electronically by processing equipment 34. The scattering coefficient of a volume containing small particles is a number between 0 and 1 defining that portion of the incident radiation which is scattered by the particles within the volume. In practice, to determine properties of the fluid in zone 24, the value of $S\theta$ can be determined for several values of angle $\theta$, and the maximum $S\theta$ and corresponding angle $\theta$ used in determining the properties of the fluid. Since the signal $A_{11}$ resulting from radiation traveling directly from radiation source 10 to radiation detector 18 is of a considerably greater strength than is the signal $A_{12}$ resulting from radiation received by detector 18 from source 12, during the time that radiation source 10 is energized by drive source 14, gain control circuit 30 reduces the gain of amplifier 26. Likewise, since the signal $A_{22}$ is of a considerably greater strength than is the signal $A_{21}$, during the time that radiation source 12 is energized by drive source 10, gain control circuit 32 reduces the gain of amplifier 28. Consequently, regardless of which radiation source is energized, the outputs of amplifiers 26 and 28 are of the same order of magnitude. These gain control factors can be considered as a constant in the $S\theta$ equation and thus can be automatically compensated in processing equipment 34.

Processing equipment 34 includes circuitry to compute the scattering coefficient $S\theta$ from the outputs of amplifiers 26 and 28 as radiation sources 10 and 12 are alternately energized. Thus, processing equipment 34 includes circuitry for storing the outputs of amplifiers 26 and 28 during the energization cycle of radiation sources 10 and 12. Processing equipment 34 can include electronic multipliers and dividers to determine the scattering coefficient $S\theta$ by operating directly on the outputs of amplifiers 26 and 28. Alternately processing equipment 34 can include suitable electronic switching and a single logarithmic circuit to determine the logarithms of the signals received from amplifiers 26 and 28 which can then be summed with appropriate signs, divided by two, and passed through an antilog circuit to provide the scattering coefficient $S\theta$. FIG. 2 depicts such processing equipment. Output lines 27 and 29 from amplifiers 26 and 28, respectively, are connected respectively to fixed contacts 40a and 40b of single-pole-double-throw switch 40. The moving contact 40c of switch 40 is tied to the input of logarithmic circuit 42.

The output of logarithmic circuit 42 is connected to one contact of each single-pole-single-throw switch 44, 46, 48, and 50. The second contacts of the switches 44, 46, 48, and 50 are connected to the inputs of sample-and-hold circuits 52, 54, 56, and 58, respectively, which, for example, might each be a capacitive voltage sampling circuit. The outputs of sample-and-hold circuits 52 and 56 are applied to the two inputs of summing circuit 60, which has its output coupled through inverter 66 to one input of summing circuit 62. In a similar manner, the outputs of sample-and-hold circuits 54 and 58 are connected to the two inputs of summing circuit 64, the output of which is connected to the second input of summing circuit 62. The output of summing circuit 62 is connected to the input of dividing circuit 68 which divides the input voltage applied thereto by two. The output of dividing circuit 68 is tied to the input of antilogarithmic circuit 70, the output of which is the processing equipment output line 36. If desired, the output of antilogarithmic circuit 70 can also be connected to averaging circuit 72 to provide an indication of average value of $S\theta$.

Lines 11 and 13, which provide energizing potential for drive source 14 to radiation sources 10 and 12, respectively, are also applied as inputs to controller 74 which controls operation of switches 40, 44, 46, 48 and 50. When line 11 provides energizing potential to radiation source 10, controller 74 causes switch 40 to close contact 40c against contact 40a and causes switch 44 to close. The remaining switches 46, 48 and 50 are open. The logarithm of the $A_{11}$ value is then stored in sample-and-hold circuit 52. Controller 74 then causes switch 40 to close contact 40c against contact 40b and causes switch 44 to open and switch 46 to close, while switches 48 and 50 remain open. The logarithm of the $A_{21}$ value is then stored in sample-and-hold circuit 54. When line 13 then provides energizing potential to radiation source 12, controller 74 causes switch 40 to close contact 40c against contact 40b and causes switch 48 to close while switches 44, 46, and 50 are open. The logarithm of the $A_{22}$ value is then stored in sample-and-hold circuit 56. Controller 74 then causes switch 40 to close contact 40c against contact 40a and causes switch 48 to open and switch 50 to close, while switches 44 and 46 remain open. The logarithm of the $A_{12}$ value is then stored in sample-and-hold circuit 58.

The output of summing circuit 60 is thus [log $A_{11}$ + log $A_{22}$ ], while the output of summing circuit 64 is [log $A_{21}$ + log $A_{12}$]. Consequently, the output of summing circuit 62 is [(log $A_{21}$ + log $A_{12}$ ) − (log $A_{11}$ + $A_{22}$ )], and the output of dividing circuit 68 is one-half that value. Antilog circuit 70 converts this value into the value of $S\theta$ which is applied to output line 36 and to averaging circuit 72 which provides a reading of the average $S\theta$ value.

Averaging circuit 72 can be an integrator or a device such as a mercury microcoulometer which provides the time average value of the signal applied to it.

While the present invention has been described with references to a preferred embodiment, numerous rearrangements and changes could be made, and still the result would be within the scope of the invention.

I claim:

1. Apparatus for determining the scattering coefficient $S\theta$ within a fluid for a scattering angle $\theta$ comprising:
   a fluid zone adapted to contain a fluid;
   first radiation means including a first radiation detector and a first radiation source for emitting radiation through said fluid zone in a first straight line path to said first radiation detector;
   second radiation means including a second radiation detector and a second radiation source for emitting radiation through said fluid zone in a second straight line path to said second radiation detector, said second straight line path intersecting said first straight line path at the scattering angle $\theta$; and
   circuit means connected to said first and second radiation detectors for generating the scattering coefficient $S\theta$ from the outputs of said first and second radiation detectors.

2. Apparatus as claimed in claim 1 further comprising excitation source means connected to said first and second radiation sources for alternately energizing said first radiation source and said second radiation source.

3. Apparatus as claimed in claim 2 further comprising:
   first amplification means coupling said first and second radiation detector to said circuit means and including first gain control means connected to said excitation source means for decreasing the gain of said first amplification means when said first radiation source is energized; and
   second amplification means coupling said second radiation detector to said circuit means and including second gain control means connected to said excitation source means for decreasing the gain of said second amplification means when said second source is energized.

4. Apparatus as claimed in claim 1 in which said circuit means includes means for generating the scattering coefficient $S\theta$ in accordance with $S\theta = [(A_{21} A_{12})/(A_{11} A_{22})]^{1/2}$ where $A_{11}$ is the output from said first radiation detector due to radiation from said first radiation source, $A_{22}$ is the output from said second radiation detector due to radiation from said second radiation source, $A_{12}$ is the output from said first radiation detector due to radiation from said second radiation source, and $A_{21}$ is the output from said second radiation detector due to radiation from said first radiation source.

5. Apparatus as claimed in claim 4 in which said circuit means includes a logarithmic circuit, means for sequentially applying to said logarithmic circuit the valves of $A_{11}$, $A_{21}$, $A_{22}$ and $A_{12}$ to generate the logarithms thereof, means for combining the logarithms for generating log $S\theta = \frac{1}{2}$ [(log $A_{21}$ + log $A_{12}$) − (log $A_{21}$ = log $A_{12}$)−(log $A_{11}$ + log $A_{22}$), and an antilogarithmic circuit connected to said last named means for generating from log $S\theta$ the value of $S\theta$.

6. Apparatus as claimed in claim 5 in which said circuit means further comprises means for generating the time average value of $S\theta$.

75

UNITED STATES PATENT OFFICE
CERTIFICATE OF CORRECTION

Patent No. 3,553,462　　　　　　　　　Dated　January 5, 1971

Inventor(x)　DENNIS F. JOHNSON

It is certified that error appears in the above-identified patent and that said Letters Patent are hereby corrected as shown below:

"Straight line" should read --straight-line-- in lines 3 and of the Abstract, and also at: Column 2, lines 1 and 3; Column 4, lines 24, 28, 29 and 30;

"Se" should read $--S_\Theta--$ at Column 2, lines 28, 49, 58, 69 and 70; Column 2, line 52, "$A_{21} = I_1 T_1 T_4 R_2 S_{74}.$" should read $--A_{21} = I_1 T_1 T_4 R_2 S_\Theta.--$;

Column 2, the equation following line 59 should read:

$$--\frac{A_{21} A_{12}}{A_{11} A_{22}} = \frac{(I_1 T_1 T_4 R_2 S_\Theta)(I_2 T_3 T_2 R_1 S_\Theta)}{(I_1 T_1 T_2 R_1)(I_2 T_3 T_4 R_2)} = S_\Theta^2 . --;$$

"Se" should read $--S_\Theta--$ at column 3, lines 12, 15, 21, 28,

"Se" should read $--S_\Theta--$ at Column 4, lines 8, 10, 19, 33, 5 (both occurrences), 64, 67 (both occurrences), and 70;

Column 4, line 65, insert --)]-- before "and".

Signed and sealed this 5th day of October 1971.

(SEAL)
Attest:

EDWARD M. FLETCHER, JR.　　　　　ROBERT GOTTSCHALK
Attesting Officer　　　　　　　　　Acting Commissioner of Pate